US008935054B2

(12) United States Patent
Mantini et al.

(10) Patent No.: US 8,935,054 B2
(45) Date of Patent: Jan. 13, 2015

(54) MONITORING SYSTEM FOR CONTROLLING LIFTABLE AND STEER AXLES ON TRUCKS OR TRACTOR TRAILERS

(76) Inventors: John Mantini, Niagara-On-The-Lake (CA); Michael Braithwaite, Hamilton (CA); Hongyan Wang, St. Catharines (CA)

( * ) Notice: Subject to any disclaimer, the term of this patent is extended or adjusted under 35 U.S.C. 154(b) by 151 days.

(21) Appl. No.: 13/286,282

(22) Filed: Nov. 1, 2011

(65) Prior Publication Data
US 2012/0123646 A1 May 17, 2012

Related U.S. Application Data

(60) Provisional application No. 61/409,090, filed on Nov. 1, 2010, provisional application No. 61/427,144, filed on Dec. 24, 2010, provisional application No. 61/446,741, filed on Feb. 25, 2011.

(51) Int. Cl.
| | | |
|---|---|---|
| B60R 22/00 | (2006.01) | |
| E05F 15/00 | (2006.01) | |
| G05D 1/00 | (2006.01) | |
| G05D 3/00 | (2006.01) | |
| G06F 7/00 | (2006.01) | |
| B62D 61/12 | (2006.01) | |
| B60G 17/019 | (2006.01) | |
| B60G 17/04 | (2006.01) | |
| G01P 3/44 | (2006.01) | |
| B60W 50/00 | (2006.01) | |

(52) U.S. Cl.
CPC .............. B62D 61/12 (2013.01); B60G 17/019 (2013.01); B60G 17/04 (2013.01); G01P 3/44 (2013.01); *B60G 2300/02* (2013.01); *B60G 2300/042* (2013.01); *B60G 2400/10* (2013.01); *B60G 2400/50* (2013.01); *B60G 2400/70* (2013.01); *B60G 2500/20* (2013.01); *B60G 2500/22* (2013.01); *B60G 2500/30* (2013.01); *B60W 2050/0045* (2013.01); *B60Y 2200/147* (2013.01)
USPC ............................................ 701/48; 280/81.6

(58) Field of Classification Search
CPC .... G01P 15/18; G01P 15/0891; B60W 10/30; B60W 10/184; B60W 10/22; B60W 30/02; B60W 2600/00
USPC .......................................... 701/48; 280/81.6
See application file for complete search history.

(56) References Cited

U.S. PATENT DOCUMENTS

| | | |
|---|---|---|
| 4,336,720 A | 6/1982 | Prokop |
| 4,854,409 A | 8/1989 | Hillebrand et al. |

(Continued)

OTHER PUBLICATIONS

Ontario Regulation 413/05 Highway Traffic Act Made:Jun. 22, 2005, pp. 1-68 Available Online @ http://www.e-laws.gov.on.ca/html/source/regs/english/2005/elaws_src_regs_r05413_e.htm#, Last Accessed Sep. 22, 2013.*

(Continued)

*Primary Examiner* — Behrang Badii
*Assistant Examiner* — Daniel L Greene
(74) *Attorney, Agent, or Firm* — Woods Oviatt Gilman LLP; Katherine H. McGuire, Esq.

(57) ABSTRACT

A monitoring system to control lift axles on a vehicle having a means for sensing vehicle speed and direction, a means for measuring the weight on the lift axles and fixed axles on the vehicle, and a control module for controlling one or more lift axles on the vehicle is provided. The control module comprises a receiver for receiving information from the sensing means and the measuring means, a processor, and output means for causing the lift axles to be lifted when the vehicle is moving in reverse. The processor causes or permits the lift axle to 1) lower when the vehicle moves forward for a programmable distance, 2) assume or maintain a lifted position when the vehicle is below a predetermined weight, 3) assume or maintain a lowered position when the vehicle carries over a predetermined weight, and 4) equalize weight between the lift axles and the fixed axles.

15 Claims, 17 Drawing Sheets

(56) References Cited

U.S. PATENT DOCUMENTS

| | | | |
|---|---|---|---|
| 5,620,194 A * | 4/1997 | Keeler et al. ................ 280/81.6 |
| 5,681,998 A | 10/1997 | Nakazaki et al. |
| 5,959,365 A * | 9/1999 | Mantini et al. ............... 307/10.1 |
| 6,259,041 B1 | 7/2001 | Dohrmann |
| 6,572,124 B2 | 6/2003 | Misna et al. |
| 6,715,778 B2 * | 4/2004 | Gottschalk et al. .... 280/124.157 |
| 6,810,982 B2 | 11/2004 | Kuhn et al. |
| 6,830,250 B2 | 12/2004 | Cervantez et al. |
| 6,921,100 B2 * | 7/2005 | Mantini et al. ................ 280/407 |
| 7,216,024 B1 | 5/2007 | Abels et al. |
| 7,222,867 B2 | 5/2007 | Rotz et al. |
| 7,408,452 B2 | 8/2008 | Knittl |
| 7,568,710 B2 * | 8/2009 | Ramsey ...................... 280/86.5 |
| 7,677,339 B2 | 3/2010 | Oscarsson |
| 7,735,516 B2 | 6/2010 | Morris |
| 2002/0019688 A1 | 2/2002 | Mantini et al. |
| 2004/0150516 A1 * | 8/2004 | Faetanini ...................... 340/444 |
| 2006/0036361 A1 * | 2/2006 | Romer et al. .................... 701/84 |
| 2007/0090934 A1 * | 4/2007 | Knittl ............................ 340/444 |
| 2008/0250894 A1 | 10/2008 | Fujiwara |
| 2008/0285901 A1 | 11/2008 | Koike et al. |
| 2009/0109066 A1 | 4/2009 | Fang |

OTHER PUBLICATIONS

Ontario Regulation 413/05 Highway Traffic Act Made:Jun. 22, 2005, pp. 1-17 Available Online @ http://www.e-laws.gov.on.ca/html/source/regs/english/2008/elaws_src_regs_r08435_e.htm#, Last Accessed Sep. 22, 2013.*

Ontario Regulation 413/05 Highway Traffic Act 2008-2010, pp. 1-74 Available Online @ https://www.e-laws.gov.on.ca/html/regs/english/elaws_regs_050413_ev002.htm#: Last Accessed Sep. 22, 2013.*

* cited by examiner

Lift axle

MONITORING SYSTEM FOR CONTROLLING LIFTABLE AND STEER AXLES ON TRUCKS OR TRACTOR TRAILERS

RELATED APPLICATION

This application claims the benefit of and hereby incorporates by reference in their entirety U.S. Provisional Patent Application Ser. No. 61/409,090, filed Nov. 1, 2010, Ser. No. 61/427,144 filed Dec. 24, 2010 and Ser. No. 61/446,741 filed Feb. 25, 2011.

TECHNICAL FIELD

This invention relates to control and monitoring of tractor-trailers and other freight-carrying vehicles, specifically, the control of lift and steer axle functionality by detection of speed, direction, and load weight, and adaptation of the vehicle configuration to optimize safety and mechanical compliance.

BACKGROUND

Different jurisdictions have different requirements for equipping and operating load-bearing transport vehicles. for example, the province of Ontario, Canada has a series of explicit requirements for "safe, productive and infrastructure-friendly vehicles" found in Regulation 413/05 under the Highway Traffic Act. The requirements include the use of an automatic device that locks the rearmost self-steering axle in the straight ahead position when a tractor-trailer is travelling at a speed over 60 kilometers per hour.

Electronic and mechanical technology related to large vehicles has been outlined in previous patent publications. By way of illustration, the following patents and publications relate to a broad spectrum of vehicle construction, monitoring, and operation.

U.S. Pat. No. 7,568,710 refers to a sensor system for actuating the lifting of a steerable axle of a vehicle. U.S. Pat. Nos. 4,854,409; 6,572,124; 6,810,982; 7,735,516 generally refer to lift axle control systems. U.S. Pat. No. 7,222,867 refers to a positioning system for a lift axle for wheeled vehicles, in which an electrical system controller is programmed to issue instructions to the lift axle means responsive to the values of the load sensors, the vehicle speed sensor, the transmission controller, the park brake position sensor and the ignition switch position sensor.

U.S. Pat. No. 5,959,365 (J. Mantini et al.) describes an early warning device for tire rims and hub assemblies. It provides a monitoring system for detecting problems associated with the wheels on vehicle axles, with one or more sensors located on the vehicle axles adjacent the wheels, a programmable micro processor for receiving and processing the sensor signals to detect an alarm condition and an alarm to alert the driver of a problem with one or more of the wheels wherein said sensors detect heat, noise or vibration. U.S. patent publication 2002/0019688 A1 describes an apparatus to monitor the rotation of the brake cam shaft, having a sensor that can convert the rotational movement of the brake cam shaft to an electrical signal.

U.S. Pat. No. 6,921,100 and describes a system for adjusting weight distribution throughout axle groups of a truck and trailer. The technology involves measuring the weight on every axle group on the truck and trailer, detecting the position of said at least one axle group on the trailer relative to said rails, calculating the weight on each axle group and determine a needed change in position on the rails to optimize the weight distribution.

U.S. Pat. No. 7,408,452 refers to a wireless wheel speed sensor. U.S. Patent publication 2009/0109066 A1 refers to a wireless wheel-sensor system for dead reckoning navigation applications. U.S. Pat. No. 6,830,250 outlines a system for automatically and simultaneously controlling one or more vehicle functions by detecting the direction of movement of and the distance traveled by the vehicle. The proposed control system includes an electronic sensor mounted on a selected one of the vehicle axles adjacent to and facing an anti-lock braking system tone ring. The sensor is electrically connected to an electronic control module, which in turn is electrically connected to a vehicle function actuation device such as a lift axle solenoid or back-up alarm actuation device.

U.S. Pat. Nos. 4,336,720 and 5,681,998 refer to a load sensing system or device for a vehicle. U.S. Pat. No. 6,259,041 refers to an onboard indicator for measuring the weight of vehicles. U.S. Pat. No. 7,216,024 generally describes an industrial truck with a stabilizing device. U.S. Pat. No. 7,677,339 is entitled Vehicle Suspension Arrangement. Published U.S. application 2008/0250894 A1 refers to a load-sensor-equipped device. Published U.S. application 2008/0285901 A1 provides a wheel support bearing assembly.

High technology vehicle operating equipment is available commercially from Wheel Monitor Inc., Niagara-on-the-Lake, Ontario. The Reverse-A-Matic™ is a trailer direction sensing system that automatically locks or lifts a self-steer axle. The RM-60 model will also lift the forward axle when the four way flashers are activated. The device transfers weight onto the drive axles for increased traction during slippery uphill conditions. The Balancer™ is an electronic liftable axle control for lifting axles when not in use. It monitors the axle load weight and lifts automatically when the trailer is empty. The Proviso™ is an electronic lift axle control system that lifts and locks axles when a vehicle is in reverse, and also has an automatic lift function based on axle load weight. It monitors the position of the lift axle and offers an in-cab light and lift axle switch for axle position monitoring and lift control.

The lift and steer axle control assembly described below, its various components, manufacture, and use, provide further advancements to the available technology.

SUMMARY OF THE INVENTION

This patent describes a system to control the positioning of liftable or steer axles on a truck or tractor-trailer by monitoring one or more input data types selected from the group consisting of speed and direction data, load data, turn signal data, engine data and emergency signal data.

In particular embodiments the present invention provides (a) a new wireless wheel end sensor that can be mounted on the end of a fixed axle (b) a new load sensor that can be used in non-air suspension vehicles by measuring strain or deflection caused by the load weight imparted on a fixed axle, or by determining the angle of a linkage arm as a proxy of the height of the vehicle's frame relative to the axle and (c) in air suspension vehicles the system may provide suspension weight equalizing controller to regulate air pressure for the auxiliary steer axle. The system is easy to install, and is suitable for use in extreme temperature conditions and with disk brakes.

One embodiment of this invention is a speed monitoring system or assembly for installation or mounting on a vehicle such as a truck or tractor-trailer. This may include a wheel speed sensor for determining wheel speed and direction, or a bi-directional speed sensor installed in the rear differential or transmission or by interpreting messages from other modules on a vehicle measuring speed and direction and a control module. In response to information received about speed of the vehicle, the control module adapts the vehicle for optimum safety, efficiency, and operating conditions. For example, it may process such information to determine when to cause or permit liftable axles to be lifted or lowered. It may also process such information to determine when a self-steering axle of the vehicle should be locked in a non-steering configuration or if air pressure for the steer axle suspension decreased if a turn signal is activated and vehicle speeds are slowing down to a pre-set speed and increased again when the turn signal is turned off.

Communication from the sensors used in conjunction with the present invention can be by way of wireless transmission or serial communication such as through the tractor/trailer Bus or the like. Preferably, the speed sensor senses both wheel speed and direction, such as by way of a two-axis accelerometer. The speed sensor can have a microcontroller that transmits information about wheel speed or direction selectively when there is change in wheel speed, and/or when wheel speed is below or above certain preset values.

When in operation, the control module may cause or permit a liftable axle on the vehicle to lift when the trailer is moving in reverse, and which causes or permits the axle to lower when the vehicle moves forward. Alternatively or in addition, it may cause or permit a steer axle on the vehicle to lock in a straight or non-steerable configuration when the vehicle is traveling above a predetermined speed. It may cause or permit the vehicle to lift an axle when the vehicle is traveling below a predetermined speed, and when the vehicle's four-way flashers are operative. It may activate the vehicle's reverse warning signals or lights when the vehicle is traveling in reverse, or control dump shuts, gate vales, undercarriage lights, or cargo lights. It may cause or permit air pressure on the air suspension of a steer axle on the vehicle to be decreased when the vehicle turn signal is activated and the vehicle is traveling below a predetermined speed and then increase when the turn signal is switched off. The control module may have additional data input, for example, from sensors to monitor wheel bearing temperatures, and sensors to monitor tire pressure, to warn the driver of abnormal conditions.

Another embodiment of the invention is the design of one embodiment of a wheel sensor itself, designed for measuring speed of a wheel on a vehicle. It is configured to transmit a wireless signal verifying status of the sensor on a periodic basis, but also configured to transmit wheel speed less often upon occurrence of one or more predetermined events, thereby reducing power drawn by the sensor from its power supply. Such events can be changes in direction or change in speed above or below predetermined levels.

Another embodiment of the invention is the system's control module. This comprises a receiver for receiving wheel speed information, a processor to determine whether a liftable axle should be in a lifted or lowered, and output to cause or permit the liftable axle to assume the desired configuration. A further embodiment of the invention is a computerized process the control module uses for controlling the lifting of a liftable axle of a vehicle or regulating the air pressure of the air suspension associated with a steer axle. The control module receives information about the speed or direction of one or more wheels of the vehicle (preferably by way of wireless transmission), processes the information to determine whether the liftable axle should be in a lifted or lowered position, and causes or permits the liftable axle to assume or maintain the desired position.

Another embodiment of the invention is a monitoring system that includes a load sensor and a module for controlling one or more liftable axles on the vehicle. The control module is configured to receive information from the load sensor about how much weight the vehicle is carrying, and causes or permits one or more liftable axles of the vehicle to assume or maintain a lifted or lowered position in response to both the weight the vehicle is carrying, and whether the vehicle is stopped. The vehicle may be an air suspension vehicle (in which case the load sensor can be a gauge that measures pressure in the air suspension system), or it may be a non-air suspension vehicle (in which case the load sensor can be a gauge that measures strain or deflection in a fixed axle in the vehicle).

Another embodiment of the invention is a specially designed load sensor to measure how much weight a vehicle is carrying, suitable for vehicles that don't have air suspension. One alternative is a strain gauge adapted for installation on a fixed axle so as to measure deflection of the axle in proportion to how much weight the vehicle is carrying. Potential locations for the strain gauge include on a fixed axle. Another alternative is a strain gauge adapted for installation on the frame rail of the vehicle preferably in proximity to the lift axle. Another alternative is an angular sensor adapted for installation between a fixed axle of the vehicle and the vehicle's frame. Further embodiments of the invention are the control module and the process it uses in accordance with the load monitoring system of the invention.

A further embodiment of the invention is an axle control system that combines features and attributes of both a wheel monitoring system and a load monitoring system as described below. The combined system comprises a wheel sensor, a load sensor, and a module for controlling one or more liftable axles on the vehicle in response to both the speed of the vehicle, and how much the weight the vehicle is carrying. The wheel sensor optionally transmits information about the speed of the vehicle to the control module wirelessly. The load sensor optionally is a strain gauge installed on a fixed axle or on the frame of the vehicle adjacent the lift axle. The system may also cause or permit air pressure on the air suspension of a steer axle on the vehicle to be decreased when the vehicle turn signal is activated and the vehicle is traveling below a predetermined speed and then increase when the turn signal is switched off. Other embodiments of the invention are control modules and processes for use with an axle control system of this invention.

The wheel speed sensors, load sensors, systems and components of this invention may be adapted to affect the positioning of a liftable axle and/or the configuration of a steerable axle automatically under appropriate conditions. Alternatively or in addition, the speed sensors, load sensors, systems and components of this invention may be adapted to permit the driver or attendant of the vehicle to control the positioning of a liftable axle, and the configuration of a steerable axle manually—but only when conditions are appropriate.

Other embodiments of the invention are vehicles installed with a wheel monitoring system, a load monitoring assembly, and/or an axle control system of this invention. Also included are methods for installing such assemblies and systems and their components on vehicles such as tractor-trailers.

Other embodiments of the invention will be apparent from the description that follows.

BRIEF DESCRIPTION OF THE DRAWINGS

The invention will now be described, by way of example, with reference to the accompanying drawings in which the same parts are designated by the same numerals, and in which.

DESCRIPTION OF THE PREFERRED EMBODIMENTS

This invention provides new systems having an improved ability to control and monitor tractor-trailers and other large vehicles during operation. Operating parameters including wheel speed can be monitored, and the information is used to make decisions about vehicle configuration: for example, to determine when to cause or permit liftable axles to be lifted or lowered, and when to cause or permit a self-steering axle to be locked in a non-steering configuration or to regulate air pressure on the air suspension of steer axles. At the discretion of the user, the system may be made to operate automatically (either independently of operator control, or by establishing default choices which the operator can override). It is designed in part for controlling the position of liftable axles, the locking of steerable axles, regulating air pressure of the air suspension associate with steer axles and the use of signaling lights as appropriate according to the position and motion of the vehicle.

It has been discovered that by dividing a monitoring system into multiple components that communicate wirelessly, it is possible to for example mount a wheel speed sensor on the axle end, rather than behind the wheel. This means that installation and maintenance substantially easier, and the sensor is protected from heat and other harsh conditions that may be generated behind the wheels, such as when using disk brakes.

It has also been discovered that by designing a system with a wheel speed sensor with a microprocessor capability that transmits information only when there is a change, power is conserved, and where employed in accordance with this invention the axle-end installation of wheel speed sensors can be maintained for several years without battery replacement. The information can be transmitted to a control module that constitutes the principal decision making component of the system, drawing the power it needs from the vehicle electrical system, processing the information to determine optimal vehicle configuration, and comprising switches and relays needed to effect the configuration desired.

A monitoring or control system according to this invention typically comprises one or more speed input devices and/or one or more load sensors, plus a module for controlling one or more liftable axles on the vehicle. The control module receives information about wheel speed and/or load weight, and/or other vehicle operating parameters and controls vehicle configuration based on the information received.

Figure 1:
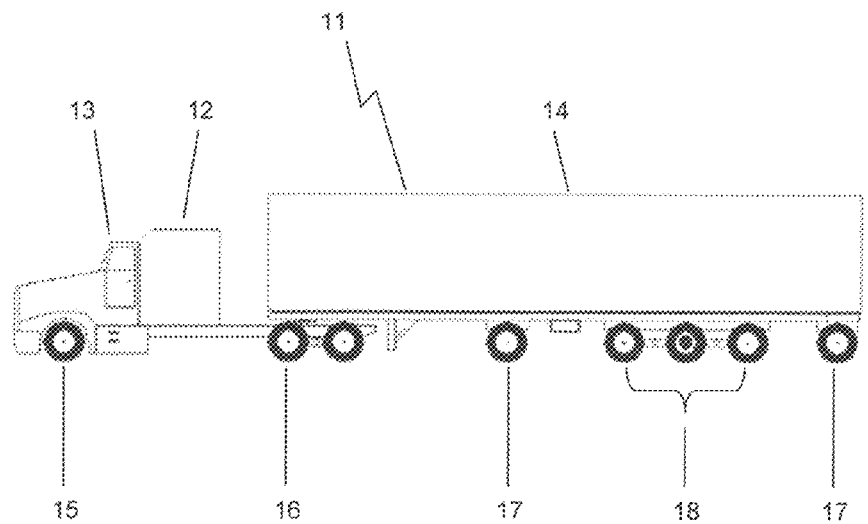
FIG. 1 is a sketch of a tractor-trailer having liftable and/or self-steer axles on the trailer, installed with one embodiment of a system to control the positioning of the liftable and/or self steer axles according to this invention.

FIG. 1 shows schematically typical type of vehicle on which an embodiment of a system to control the positioning of liftable or steer axles on a truck or tractor-trailer according the invention is installed. By way of illustration, the vehicle 11 exemplified here has a tractor 12 with a cabin 13 pulling a trailer 14. There is a front steer axle 15, two drive axles 16, and liftable axles 17 surrounding a tridem 18 of three fixed axles that are horizontally adjustable in accordance with load distribution. The system according to the present invention will include various operating input selected from the group consisting of vehicle speed and direction, vehicle load, plus a module for controlling one or more liftable axles on the vehicle. The control module receives information about vehicle speed and/or load weight, and/or other vehicle operating parameters and controls vehicle configuration based on the information received. The control module (not shown) that receives information from the speed sensor and controls vehicle configuration may be installed near the middle axle in the tridem on the underside of the bed of the trailer, so as to be proximate to any wheel speed sensor for monitoring speed and direction, thereby improving integrity of data transfer.

Speed and Direction Monitoring

Various types of speed and direction monitoring methods can be used in accordance with systems of the present invention to responsively control axle lifting and vehicle configuration in accordance with this invention.

Wheel Speed Sensors

Traditionally, two separate Hall-Effect sensors are employed to detect the wheel speed and direction (see U.S. Pat. No. 6,830,250). A Hall effect sensor is a transducer that varies its output voltage in response to changes in magnetic field. To measure wheel speed, it is mounted in a steel holder that is usually welded on the axle.

There are two disadvantages on this type of sensor. One is the work required for installation: the wheel must be pulled out in order to get access to the axle. The other disadvantage is that the maximum operating temperature is generally limited to 150° C. This limits the range of use and the life expectancy of the sensor where the temperature around the tone ring is very high: for example, when a disk brake is used. More and more disk brakes are being employed on commercial trucks and trailers.

Figure 2:
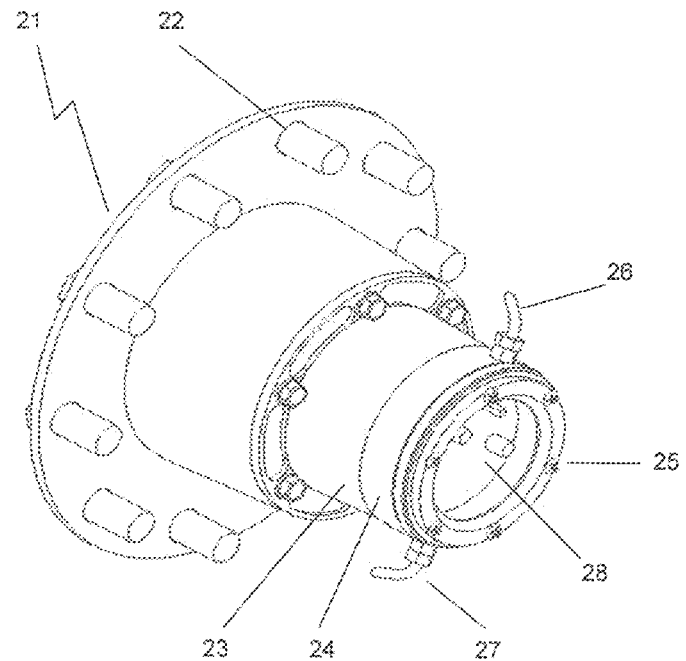
FIG. 2 is a drawing that shows one embodiment of a wheel sensor installed on the hub of the vehicle for monitoring speed and direction.

One of the embodiments of this invention is an improved wheel speed sensor for use with the systems of the present invention that is less difficult to install and maintain. It is designed to conserve power, allowing the sensor to run off a single set of batteries for as much as two, three, or five years without replacement. Optionally, the sensor may also have a small solar panel or mechanical generator to recharge the batteries as needed. FIG. 2 illustrates how one form of wireless wheel speed sensor for use in association with this invention can be installed on the end of a fixed axle. The wheel hub 21 attached to the vehicle by way of bolts 22 often has a cover that can be removed. In its place, a sensor housing 24 can be installed exterior to the hub cap 23, enclosing the electronic componentry 28 of the sensor. The device can be secured onto the axle end by way of screws 25 that pass from the outside through to the same screw holes to which the hub cover is normally attached. The diagram also shows optional connections 26 and 27 that can be adapted to monitor pressure in the inner and outer tires, respectively.

Figure 3A:
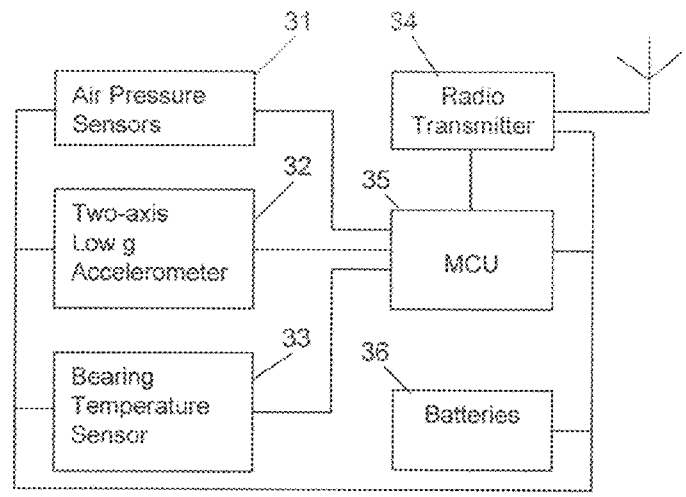
FIG. 3(A) is a block diagram for a wheel sensor of FIG. 2, showing the processor unit (MCU) and other functional components.
Figure 3B:
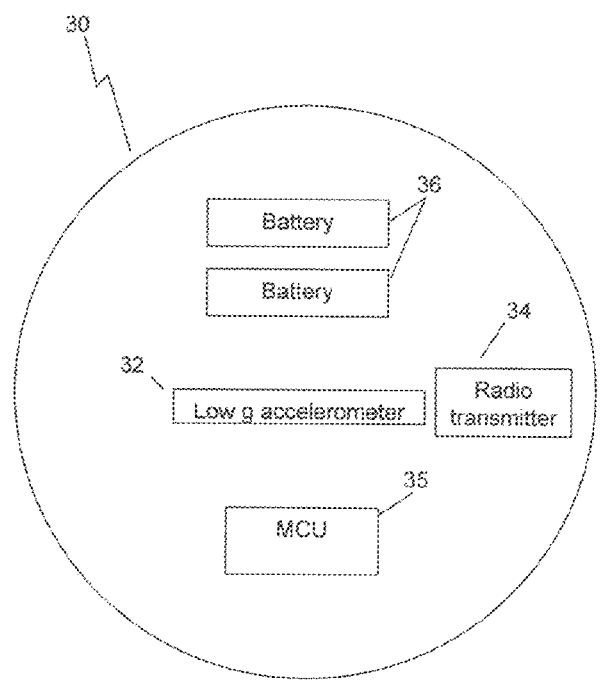
FIG. 3(B) shows the placement of the components inside a wheel sensor of FIG. 2.

FIG. 3(A) generally shows a block diagram of components in a wireless speed sensor of the type illustrated in FIG. 2. FIG. 3(B) shows the positioning of the components in a circular circuit board or support 30 designed to fit across the cross-section of the axle end. The microcontroller (MCU) 35 or processor chip receives information about wheel orientation, for example, from an accelerometer 32 capable of measuring in at least two axes. If desired, the MCU can also be connected so as to obtain information from tire air pressure sensors 31 and bearing temperature sensors 33. Wheel speed and direction and other data can be sent by wireless transmitter 34 to the control module (e.g., FIG. 6(A) or 6(B)). The MCU processes the information over time to determine wheel speed and direction, drawing power from one or more batteries 36 that may be installed as part of the axle-end device, thereby operating independently of the vehicle power supply.

Figure 4A:
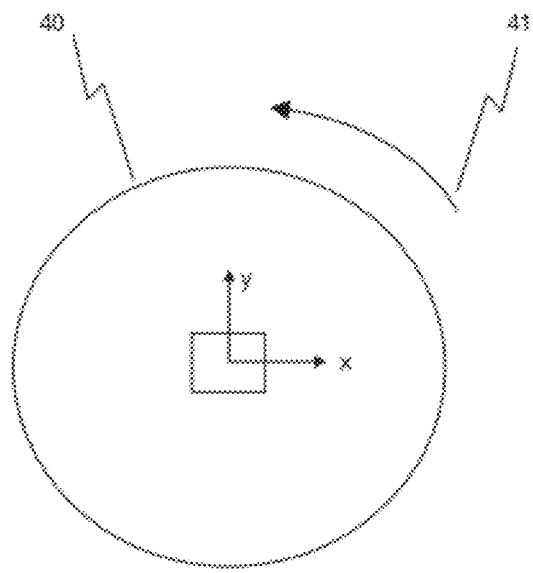
FIG. 4(A) shows how the vectors measured in a rotating wheel by a two-axis accelerometer in a wheel sensor of FIG. 2.
Figure 4B:
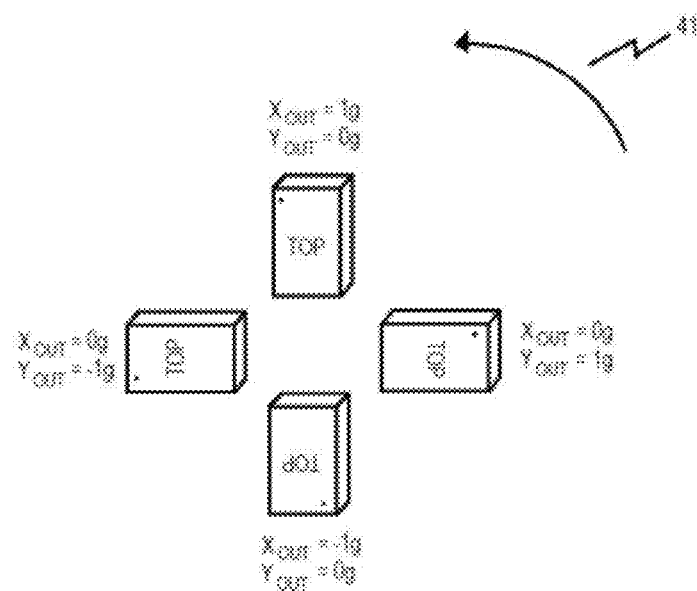
FIG. 4(B) shows accelerometer output response versus orientation to gravity.
Figure 4C:
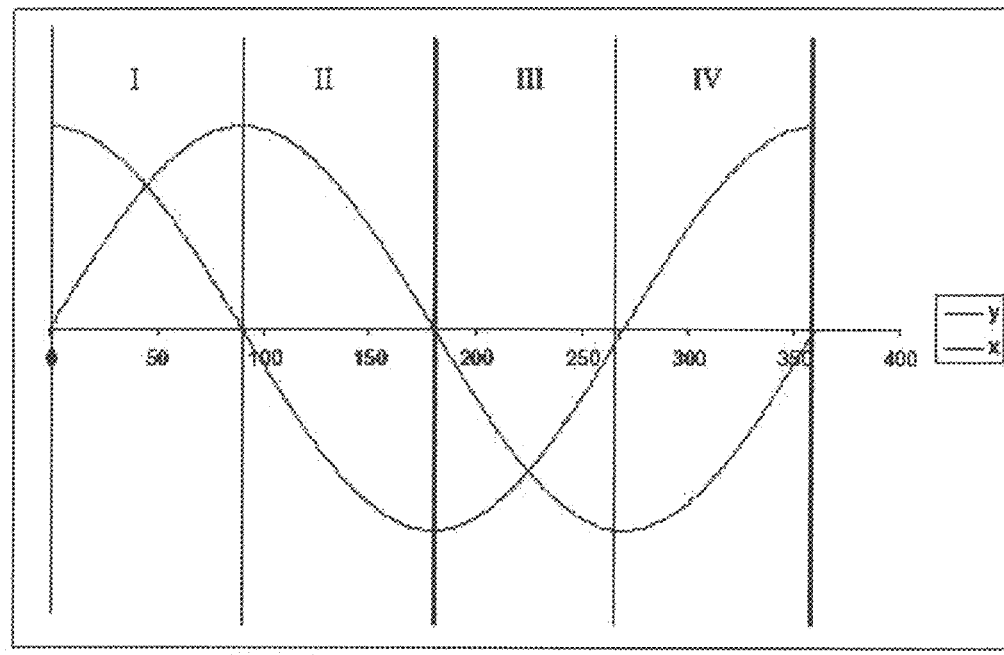
FIG. 4(C) shows the output waveforms generated by a two-axis accelerometer when the wheel is rotating.

FIG. 4(A) and FIG. 4(B) depict vectors by which rotation of a wheel are measured. A wheel 40 to which the sensor assembly is attached is shown viewed along the axis of rotation 41. By checking the angle periodically at a predefined time period (say, every 20 milliseconds), the wheel rotation and speed can be determined. For a 2-axis accelerometer, the X and Y output will be changed between from −X to X for x-axis output and −Y to Y for Y axis output when rotate the accelerometer with the x-y plane vertically to the ground. For certain type of low g accelerometers, the Xmax and Ymax equals g. The X and Y output get their absolute maximum at the positions parallel to the X and Y axis. In the positions other than the X and Y axis, the output from X accelerometer and Y accelerometer are as shown in FIG. 4(C). By calculating the invert trigonometry function of the X and Y outputs, the absolute angle referenced to the positive X axis can be obtained. By examining the angles constantly in time, the device can detect if the wheel is rotating, and its speed and direction.

The "direction" of a wheel (as the term is meant in this disclosure) refers to whether the wheel is rotating to move the vehicle in a forwards direction or to move the wheel in a reverse direction. The "speed" of a wheel refers to the change in distance over time of the vehicle occasioned by rotation of the wheel in either direction. A change of direction occurs when a wheel changes between a stopped, forward, or backward motion in any combination. A change in speed of a wheel may also include a change in direction.

In order to maximize the battery life, the components shown in FIG. 3 may be powered cyclically. Since most of the power from the battery will be consumed during the transmission of the message, the battery life can be extended by optimizing message transmission.

By way of illustration, the microcontroller in the sensor can be activated periodically to check the angle and to record the current angle position for the next comparison. Whenever the MCU detects any changes in the status of the wheel movement, for instance, from stop to reversing, or from reversing to stop, or when the speed is below or above the certain preset values, the MCU will turn on the Radio Frequency Module to transmit this message to the main control module. This is called event trigger message transmission. To ensure that this information is received by the main control module successfully, this event message can be transmitted multiple times (e.g., three times), or until a confirmation signal of some type is received back from the control module. In periods between events (such as when the vehicle is stopped or traveling at constant speed), the MCU will stop transmission or transit less often so as to conserve power. As long as the wheel sensor is working, the MCU in the control unit will interpret a lack of transmission from the wheel sensor to be an indication that the speed of the wheel is essentially unchanged from the previous reading.

Radio transmitter chips can be obtained, for example, from Infineon Technologies, Milpitas Calif. that consume about 9 milliamps when output 5 dbm at a 50 ohms load, and only 0.4 microampere in sleep mode. Multiple axes accelerometers suitable for use in this arrangement may be acquired commercially, for example, from Analog Devices Inc., Norwood, Mass. Exemplary are chips that consume only about 23 microampere in measurement mode, and 0.1 microampere at standby mode.

In addition to event trigger message transition, the sensor will transmit a reporting message periodically (say, every 5 or 10 seconds) to tell the main control module that the sensor transmission is within the range and the sensor operates properly. In case the main control module has missed the reporting message for pre-defined times, it will trigger a warning light to alert drive that a check up or maintenance is required on the sensor.

Figure 15:
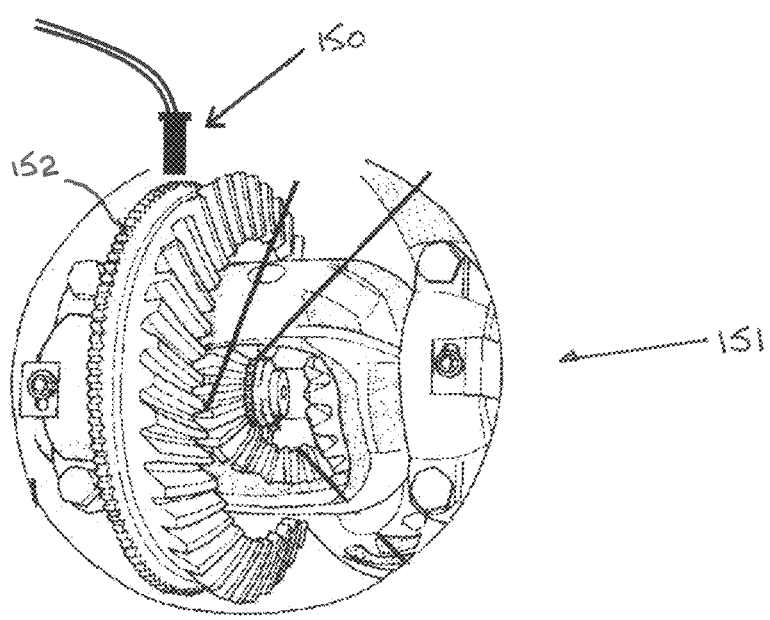
FIG. 15 shows a bi-directional speed sensor to detect the speed and direction of a tone ring or gear installed in the rear differential in accordance with another embodiment of the invention.
Figure 16:
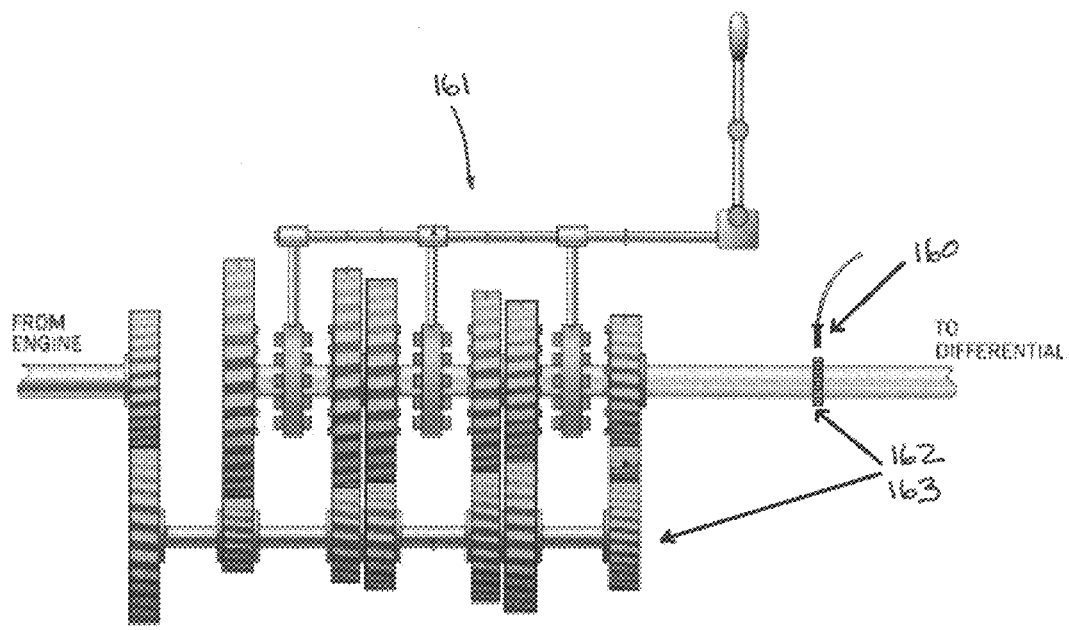
FIG. 16 shows another bi-directional speed sensor to detect the speed and direction of a tone ring or gear installed in the transmission in accordance.
Figure 17:
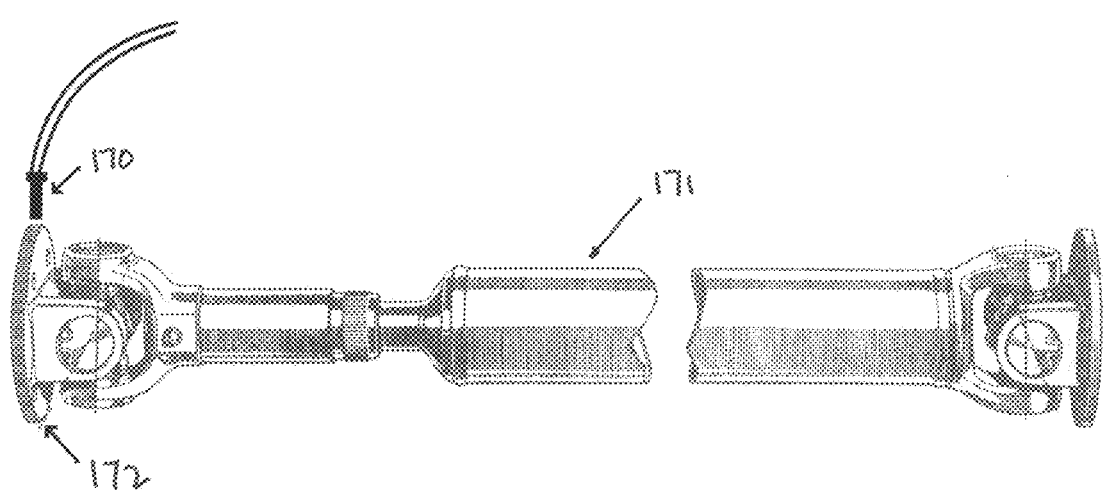
FIG. 17 shows another bi-directional speed sensor to detect the speed and direction of a tone ring or gear installed on the drive shaft with another embodiment of the invention.
Figure 18:
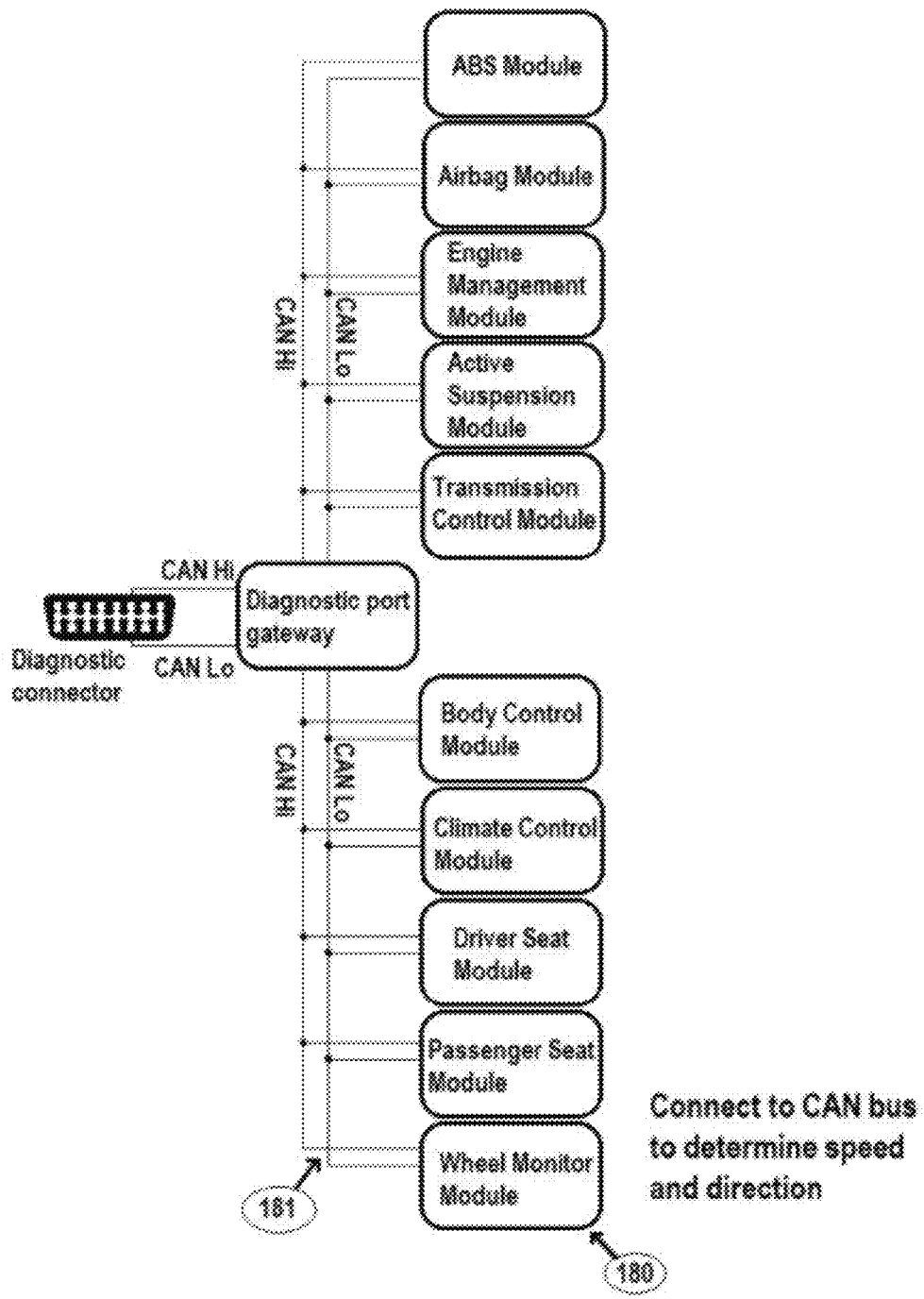
FIG. 18 shows the control module of another embodiment of a system according to the present invention connected to the CAN bus in a for intercepting messages from other modules that are already measuring the speed or direction of the vehicle.

Other means of monitoring vehicle speed and direction that may be used with the systems of the present invention are illustrated in FIGS. 15-18. In FIG. 15 a bi-directional speed sensor 150 installed in the rear differential, generally indicated at 151, is illustrated to detect the speed and direction of a tone ring or gear 152. By knowing the diameter and number of teeth on the ring/gear 152, the control module receiving data from sensor 150 can calculate the speed and direction of the vehicle. In FIG. 16 a bi-directional speed sensor 160 installed in the transmission, generally indicated at 161, is used to detect the speed and direction of a tone ring 162 or gear 163. By knowing the diameter and number of teeth on the ring/gear 162,163, the control module can calculate the speed and direction of the vehicle. In FIG. 17 a bi-directional speed sensor 170 installed on the drive shaft 171 is used to detect the speed and direction of a tone ring or gear 172. By knowing the diameter and number of teeth on the ring/gear 172, the control module can calculate the speed and direction of the vehicle. In FIG. 18 a control module 180 of a system according to the present invention is connected to the CAN bus 181 in a vehicle for intercepting messages from other modules that are already measuring the speed or direction of the vehicle. The speed and directional data from the sensors in FIGS. 15-17 can be transmitted wirelessly or by means of an ABS wheel speed sensor activating the lift axle reading serial communications such as a signal through the Can Bus J-1939, J-1708, J-1597-J-2497 or backup light switch when vehicle is reversing or the like.

Control Module

The control module is a component of the monitoring systems of this invention that receives information about the vehicle (such as wheel speed and load), and process the information to determine whether and how the vehicle should be adjusted to improve safety, efficiency, maneuverability, power, and other desirable attributes of travel. This includes the optimal position of the lift axle, which it controls, for example, by way of pressure in the lift axle bag. The invention can be used on trucks and trailers that have an air suspension, or that have another type of suspension (such as a mechanical leaf spring or rubber suspension). The pressure of the suspension bags of the liftable axle can also be fine-tuned to distribute the load between lift axle and tandem or tridem axles.

Figure 5:
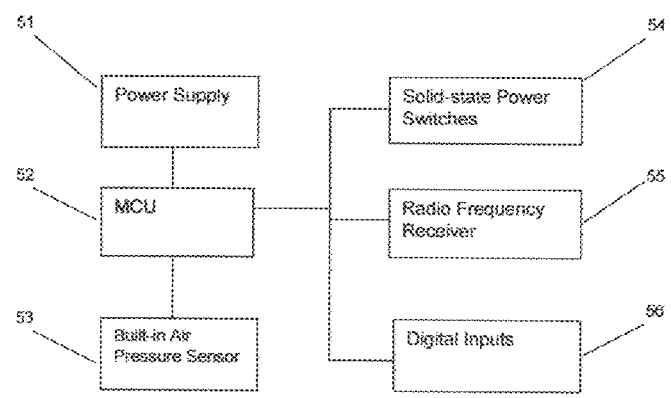
FIG. 5 is a block diagram showing component parts of a control module of this invention.

FIG. 5 generally illustrates a possible interaction of components within a control module of this invention. The central processor (MCU) 52 can be powered from the vehicle power supply 51. Data such as wheel speed that is transmitted wirelessly may be inputted into the device by way of a receiver 55. Data from built-in air pressure sensors 53 and digital input 56 regarding other aspects of the vehicle condition and function can be brought in by hard wiring. Once the data is processed to determine optimal axle positioning, signal function, and so on, the control module may have power switches 54 that connect with control valves, signaling connections, and other vehicle componentry to be adjusted. Alternatively or in addition, the control unit may wirelessly or digitally connect to solid-state switches located at or around the vehicle components to be adjusted.

Figure 6A:
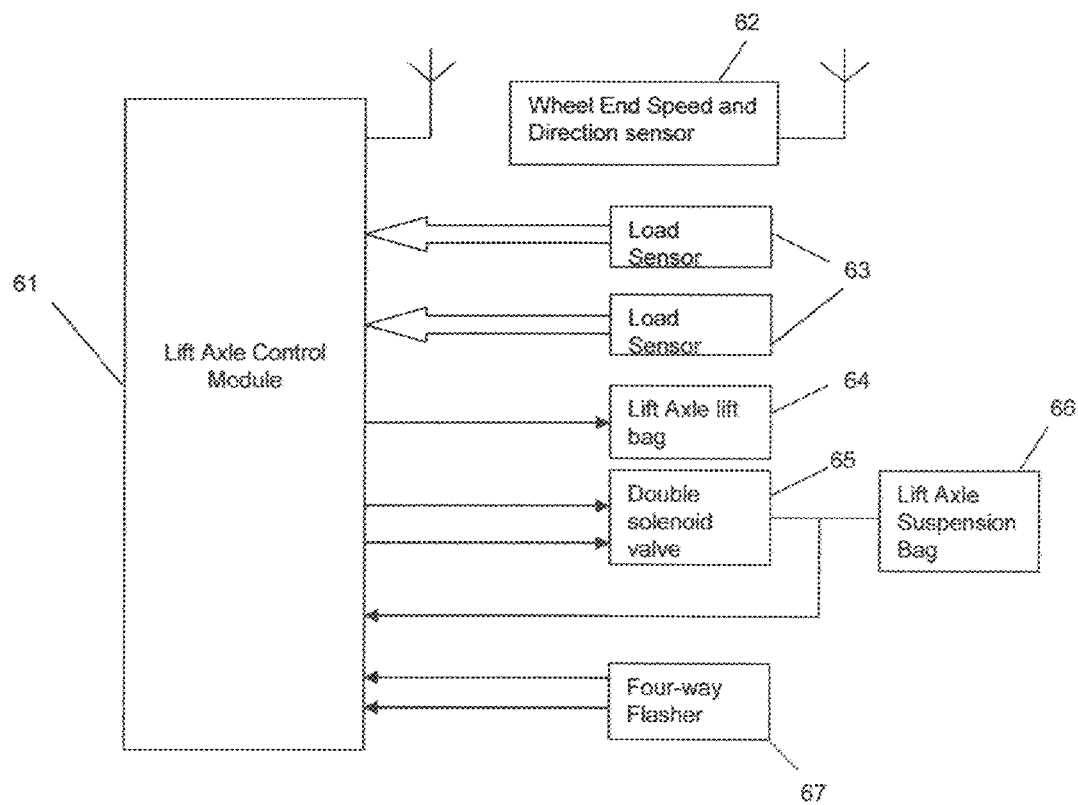
FIG. 6(A) is a diagram that generally depicts a system according to one embodiment of the present invention comprising a wheel sensor, a control module, and various input and output components, as applied to non-air suspension vehicles.

FIG. 6(A) generally illustrates how the control module can be configured in a vehicle that does not have an air suspension. The control module 61 receives wheel speed information from the sensor 62, determines the optimal position of the lift axle, and controls the lift axle lift bag 64 accordingly. A lift axle suspension bag 66 can be controlled by way of a double solenoid valve 65. The determination whether the axle should be in the lifted or lowered position can be based in part on information received from one or more load sensors 63 that may be located in a fixed axle, and/or whether the four-way flashers are in operation 67. The option of incorporating information from load sensors 63 is described in more detail in the section that follows.

Figure 6B:
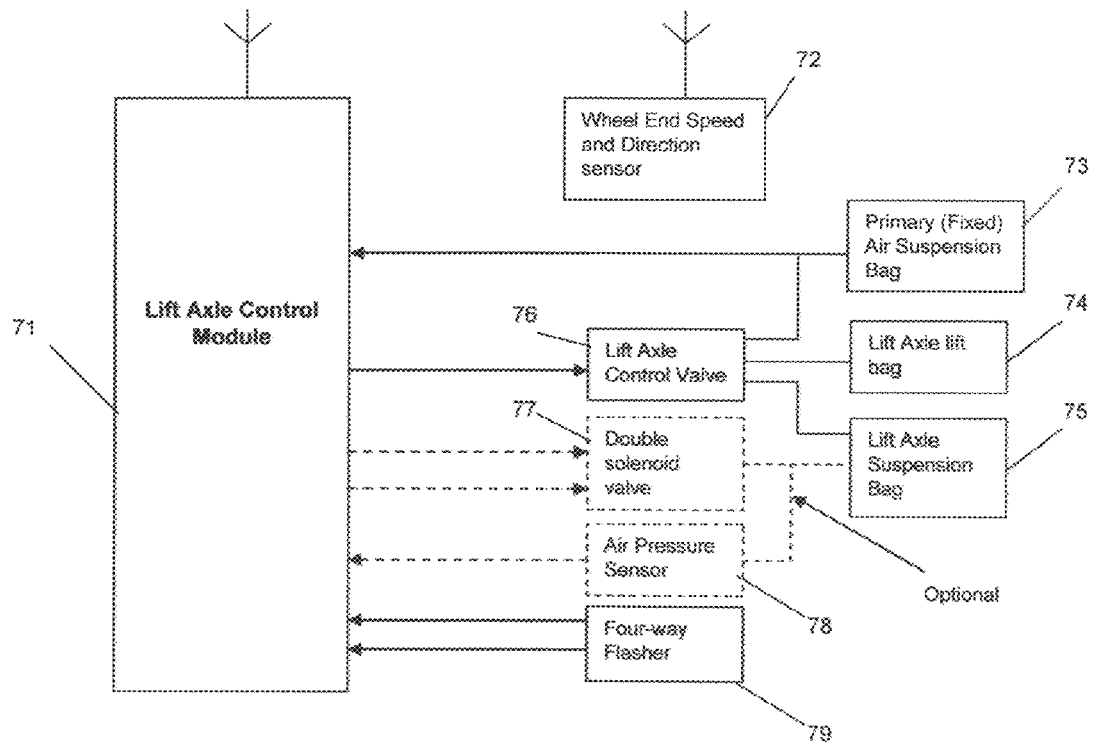
FIG. 6(B) depicts a system according to another embodiment of the present invention applied to air suspension vehicles.

FIG. 6(B) generally illustrates how the control module can be configured in a vehicle having full air suspension. The control module 71 receives wheel speed information from the speed sensor 72 and the four-way flashers 79. Based on the data received, it determines the optimal position of the lift axle, and controls the lift axle control valve 76, which relays to the primary air suspension bag 73, the lift axle lift bag 74, and the lift axle suspension bags 75. Pressure in the primary air suspension system 73 can be monitored as an indicator of load status. Pressure in the lift axle suspension 75 can also be monitored through an air pressure sensor 78 so that its position may be adjusted by way of a valve 77 to assume an optimal proportion of vehicle weight, compared with the fixed axles.

The control module can be programmed to lift and lower the self steer lift axle automatically, based on several criteria such as the wheel speed and direction, whether a four-way flasher is activated, or the load on the tandem or tridem axles on the truck or trailer. The self steer lift axle can be lifted automatically when the truck is reversing to ease the maneuverability. The front self steer lift axle can also be lifted with an emergency four-way flasher to improve the traction in a slippery road. The self steer lift axle can be lowered down automatically when the truck is loaded, providing the vehicle is stopped.

Alternatively or in addition, the control module may be programmed to permit the driver to have manual control of a liftable axle, and/or manual control of a steerable axle, but only when appropriate conditions are in place. By way of illustration, a convention vehicles use to signal the raising of an axle on an upgrade to improve traction is as follows: the driver activates the four-way flashers for ~3 seconds, turns off the four-way flashers for ~3 seconds, and then reactivates the four-way flashers and that causes the axle to be raised. To accommodate such a signaling convention into this invention, the control module is programmed to permit the axle to be raised when both the four-way flashers are activated and when the wheel speed is sensed to be below a certain pre-set speed. When both of these conditions are not in place, the control module blocks manual control of the liftable axle by the driver.

Whether the control module is programmed to cause axle positioning and steerability to change automatically, or in response to driver control, the control module can optionally incorporate a manual override that permits the driver to alter axle positioning and steerability in conditions where such alterations are not otherwise permitted, so as to accommodate an emergency situation.

Figure 19:
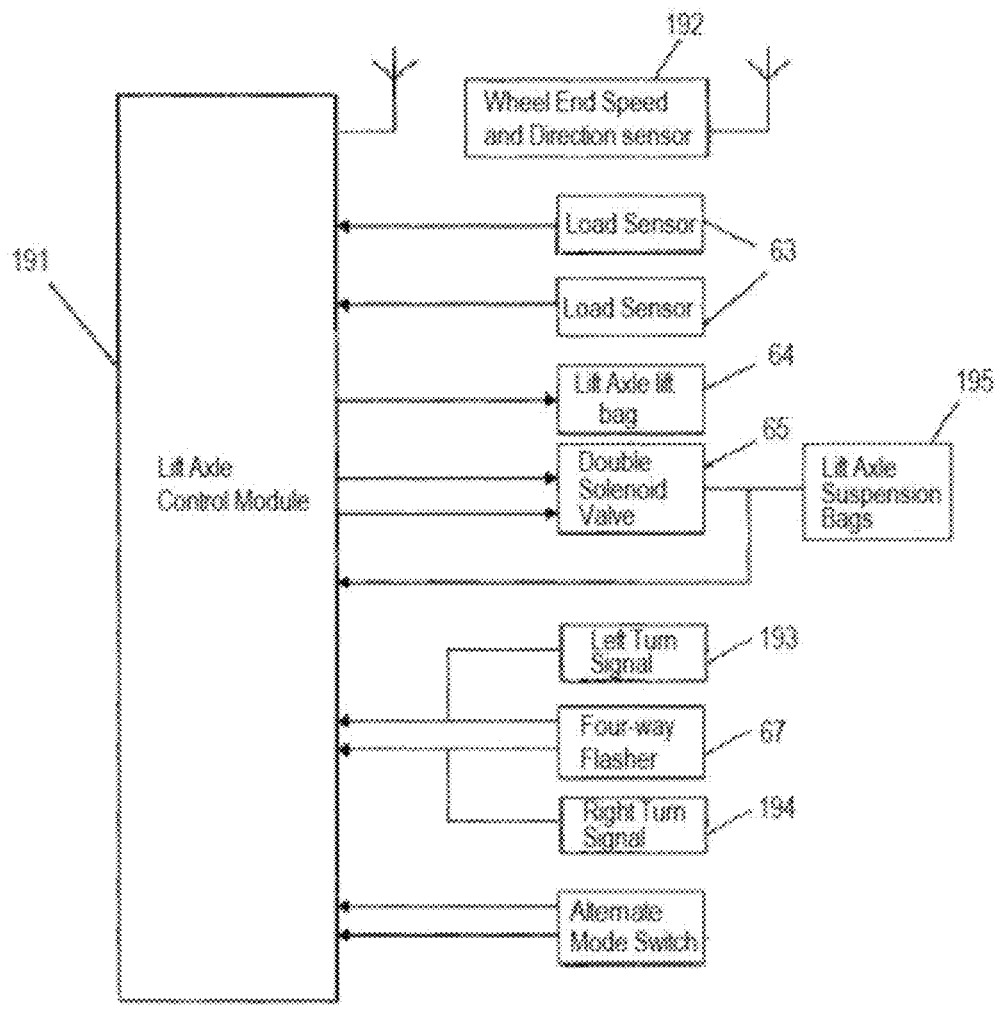
FIG. 19 is a diagram that generally depicts another embodiment of a system according to the present invention including a control module having a suspension weight equalizing controller to regulate air pressure for the auxiliary steer axle on a vehicle with air suspension.

FIG. 19 generally illustrates how a system according to the present invention including a control module having a suspension weight equalizing controller to regulate air pressure for the auxiliary steer axle on a vehicle with air suspension can be configured in a vehicle having full air suspension. If the weight of the vehicle is equalized on most or all axles there may not be enough weight on the main steer axle to allow a driver to safely enter into an intersection and manage the vehicle around the intersection when turning without losing control, particularly in wet or winter slippery conditions.

When a system is equipped with the weight equalizing controller to regulate air pressure for the auxiliary steer axle of the present invention, when a turn signal is activated (either right or left), for example when a driver is approaching an intersection at programmed set speeds such as 30 km/hr, the control module 191 receives speed and direction information from the speed sensor 192 (whether of the type shown in FIG. 2, 14, 15, 16 17 or 18 or other appropriate device) and the right 193 or left turn signal 194. Above the programmed set speeds, the control module 191 will not allow the system to decrease the previously programmed air pressure of the air suspension system associated with a liftable steer axle. Based on the data received, it determines decreases the air pressure of the lift axle suspension 195 to assume an optimal proportion of vehicle weight, compared with the fixed axles during the turn. Once the turn signal is switched off the air pressure of the lift axle suspension 195 is increased back to the pre-turn value.

By program the control module the system can be used to automatically or have a switch that will allow the vehicle to equalize weight per axle through half load seasons. Each jurisdiction, county or municipality may have different allowable weights per axle during the half load season. With the adjustable software parameters of the systems of the present invention, vehicles with auxiliary automatically controlled liftable self steer axles are able to operate when they otherwise could not.

Load Sensor

This invention also provides a monitoring system with a load sensor to measure the extent to which the truck or trailer is loaded, or how much weight, and a control module that causes or permits one or more liftable axles of the vehicle to assume or maintain a lifted or lowered position in response to both the weight the vehicle is carrying, and whether the vehicle is stopped.

Figure 10A:
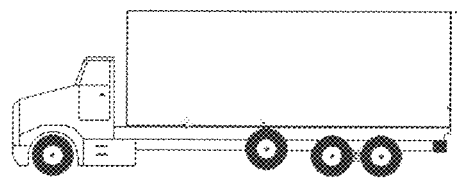
FIG. 10(A) and FIG. 10(B) respectively depict a box truck and a tractor trailer having a liftable axle that can be controlled and adjusted by way of a load sensor assembly of this invention.
Figure 10B:
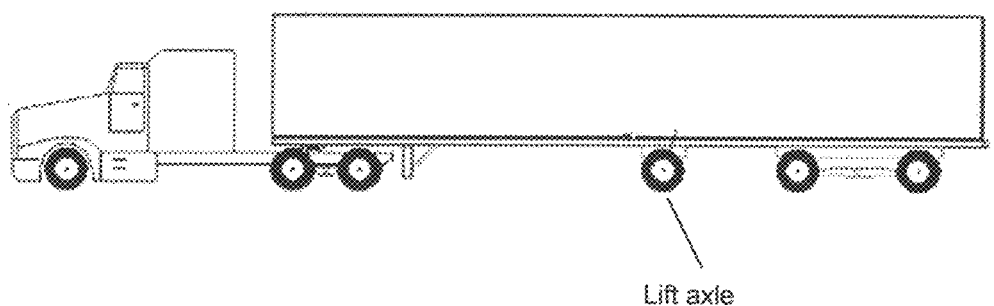

The system can also adjust the weight supported by the lift axle in compliance with local regulations. For example, Legislation in the province of Ontario mandates that when the lift axle is deployed to the lowered position, the weight supported by the lift axle should be equal or proportional to the weight on the tandem axle for a box truck of the type shown in FIG. 10(A), or the average weight per axle of the tandem axle for a tractor-trailer of the type shown in FIG. 10(B).

For trucks or trailers equipped with air suspension, the load on the tandem or tridem axles can be determined by measuring the air pressure in the suspension bag, as shown in FIG. 6(B). Since the ride height is constant, the pressure in the suspension bag is proportional to the load it supports.

For trucks or trailers equipped with other types of suspension, such as a solid rubber, coil, or leaf spring suspension, this invention provides a special sensor apparatus to measure vehicle load. One alternative is a strain gauge installed on a fixed axle of the vehicle. Another alternative is an angular sensor installed between a fixed axle of the vehicle and the vehicle's frame.

Figure 7A:
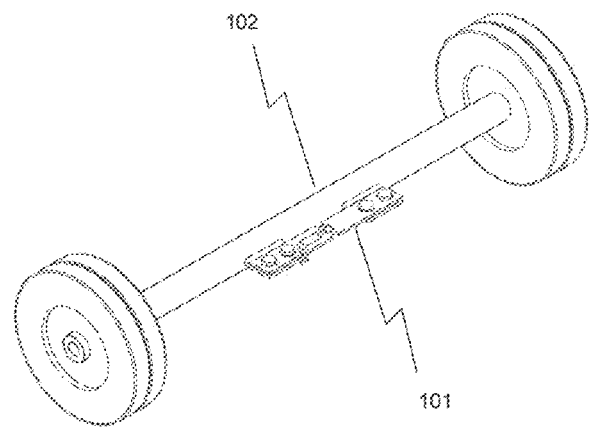
FIG. 7(A), FIG. 7(B), and FIG. 7(C) show how a load sensor comprising a strain gauge may be installed on a fixed axle of a vehicle without air suspension in accordance with the present invention.
Figure 7B:
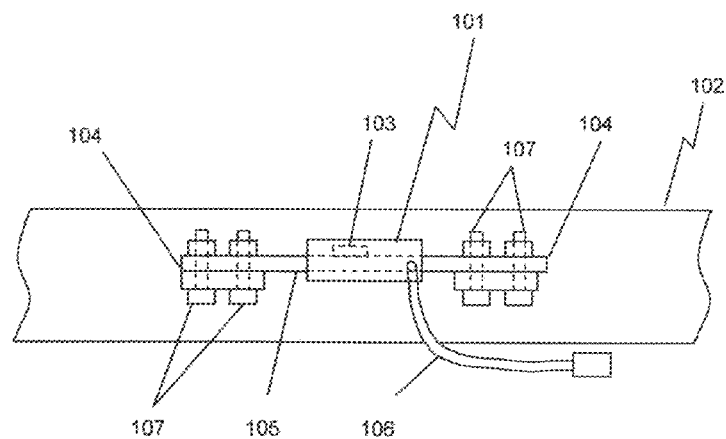
Figure 7C:
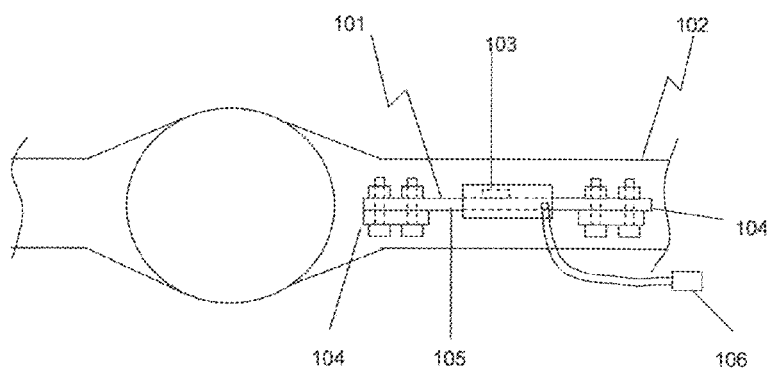

FIGS. 7(A), 7(B), and 7(C) generally show an exemplary strain gauge type load sensor 101 installed on a non-air suspension trailer. The strain gauge 103 is adapted for installation on a fixed axle 102 of the vehicle so as to measure deflection on the axle in proportion to how much weight the vehicle is carrying. Two installing tabs 104 are welded on the side of the axle and within the axial center area of the axle. The load sensor housing 105 is mounted on the tabs 104 through four ⅜" bolts 107. With the axle 102 loaded, the deflection of the axle will transfer to the strain gauge 103 bonded on the sensor housing 105. The sensor cable 106 will supply the excitation voltage needed for exciting the strain gauge and pick the load signal from the strain gauge to the control module.

Figure 8:
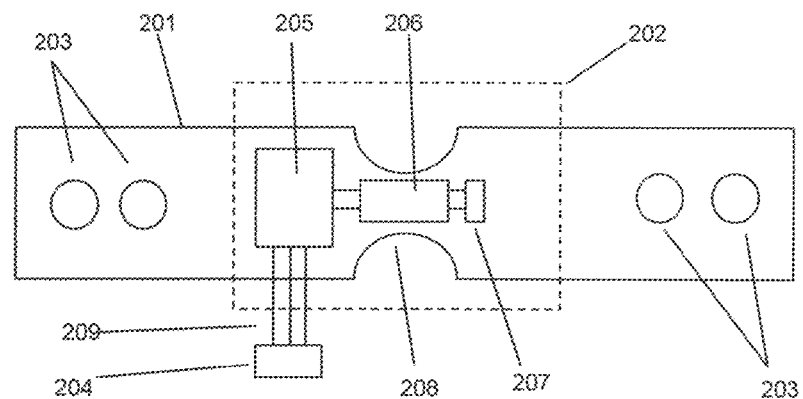
FIG. 8 shows the overall structure of a load sensor that measures load weight according to deflection of an axle in a vehicle in which it is installed.

FIG. 8 shows a possible configuration of component parts of a load sensor of this invention. It has a stainless steel substrate 201, strain gauge 206, temperature sensor 207, electronics circuit board 205, encapsulation 202, electrical cable 209 and sealed connector 204. The two installing holes 203 on each end of the sensor will provide reliable mechanical contact between the sensor substrate and the installing brackets so that any deflection from the axle due to load will transfer to the strain gauge bonded on the substrate. The strain gauge is boned 208 on the center area of the substrate where the substrate is cut out. This provides a mechanical amplification on the strain gauge output. The electronic circuit board, strain gauge and temperature sensor can be encapsulated on the stainless steel substrate to achieve a complete sealed sensor assembly.

Figure 9:
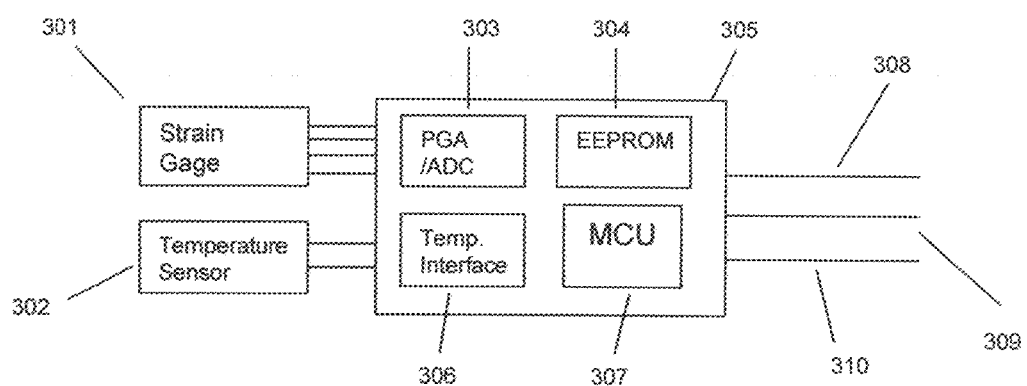
FIG. 9 is a diagram showing the internal components of the load sensor of FIG. 8.

FIG. 9 generally shows the electronics implemented in a strain-gauge load sensor of this invention. The signal from strain gauge 301 is amplified by the Programmable Gain Amplifier (PGA) (an electronic amplifier where the gain can be controlled by external signals) and converted to digital quantities through the Analog to Digital Convertor (ADC) 303 located within the circuit board 305. The temperature sensor 302 reads the temperature beside the strain gauge. The Microcontroller (MCU) 307 obtains the temperature compensation coefficients from EEPROM 304 (Electrically Erasable Programmable Read-Only Memory, a type of non-volatile memory used in computers and other electronic devices to store small amounts of data that must be saved when power is removed.) The MCU then converts the strain gauge reading into load. The load information is sent to the control module through the Universal Asynchronous Receiver/Transmitter (UART) compatible one wire 309. The load sensor is powered by wire 308 and grounded by wire 310.

In operation, the output of the strain gauge is proportional to the load on the axle. Thus, by measuring the output from the strain gauge, the MCU 307 can convert this reading to the load weight. Since the output of the strain gauge changes with temperature (the thermal output of the strain gauge), the temperature compensation to this change should be incorporated. A full-bridge strain gauge with its temperature characteristic matched to that of the stainless steel substrate is preferred to minimize this thermal output. A temperature sensor can be used in order to eliminate this thermal output. For first order compensation, four readings are needed in order to calculate the temperature coefficients: specifically, the empty and full load reading at a cold temperature (e.g. −30° C.), and the empty and full load reading at a warm temperature (e.g. 60° C.). By compensating appropriately, a load sensor may be used in a temperature range from −40° C. to +85° C.

Traditionally, the offset from the strain gauge will be compensated first with a Digital to Analog (ADC) convert then the signal is amplified by an instrumental amplifier. Since the effective signal from the strain gauge is very small (e.g. 2 mv/V), this would require a very low offset and drift amplifier and DAC. The signal from the strain gauge can be processed using a high precision (24 bits) Sigma-Delta ADC with built in programmable gain amplifier. This chip can directly connect to a strain gauge without the needs to compensate the offset from strain gauge. The MCU in the strain gauge sensor board can remove this offset by software. A chip usable for this purpose is AD7799 obtainable from Analog Devices Inc., Norwood, Mass.

Figure 11:
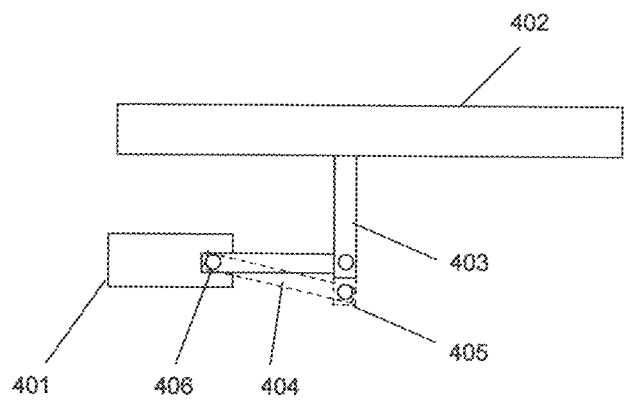
FIG. 11 shows an angle type load sensor to measure vehicle load as a function of the relative height between a fixed axle and the vehicle frame.

FIG. 11 generally shows an exemplary angle type load sensor that can be used with this invention in place or as well as a strain gauge type load sensor. The angle type load sensor measures load weight as a function of the relative height or distance between the frame and the axle, since the frame will be closer to the axle with a heavier load. This illustration shows the load sensor 401 connected to the vehicle frame 402 by way of two linkage arms 403 and 404 joined through a ball joint 405. With a heavier load, the frame is compressed down towards the roadway. This drives linkage arm 403 downwards, thereby causing linkage arm 404 to be positioned so as to be more downwards sloping. The angle 406 of linkage arm 404 relative to the axle housing is measured by the sensor 401 as a manifestation of vehicle weight, and thus the weight of the load it contains.

Figure 12A:
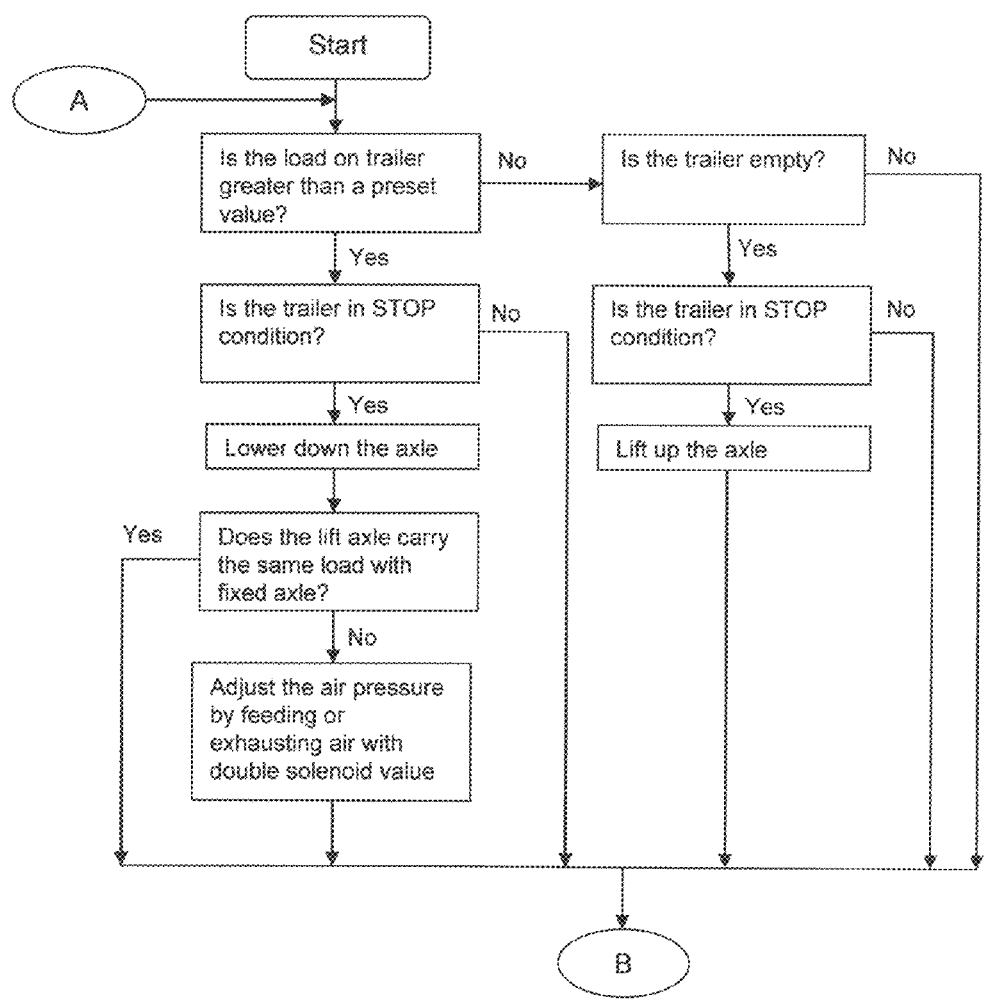
FIG. 12(A) and FIG. 12(B) provide a decision algorithm that illustrates how the control module determines when one or more liftable axles of the vehicle should assume or maintain a lifted or lowered position in response to load weight, whether the vehicle is stopped, and whether the four-way flashers are in operation.

FIG. 12(A) shows a possible decision-making algorithm by which the control module makes a determination whether to lift or lower a liftable or self-steer axle. For safety reason, the control module can be programmed to only lift or lower the lift axle when the vehicle has stopped. If the trailer is empty and stopped, the control module will activate the lifting of the axle, if not already lifted. If the trailer is loaded above a pre-set condition or weight and the vehicle is stopped, the axle is lowered. The lift axle can be adjusted to carry about the same load as the fixed axles by adjusting the air pressure in the lift suspension bag.

Figure 12B:
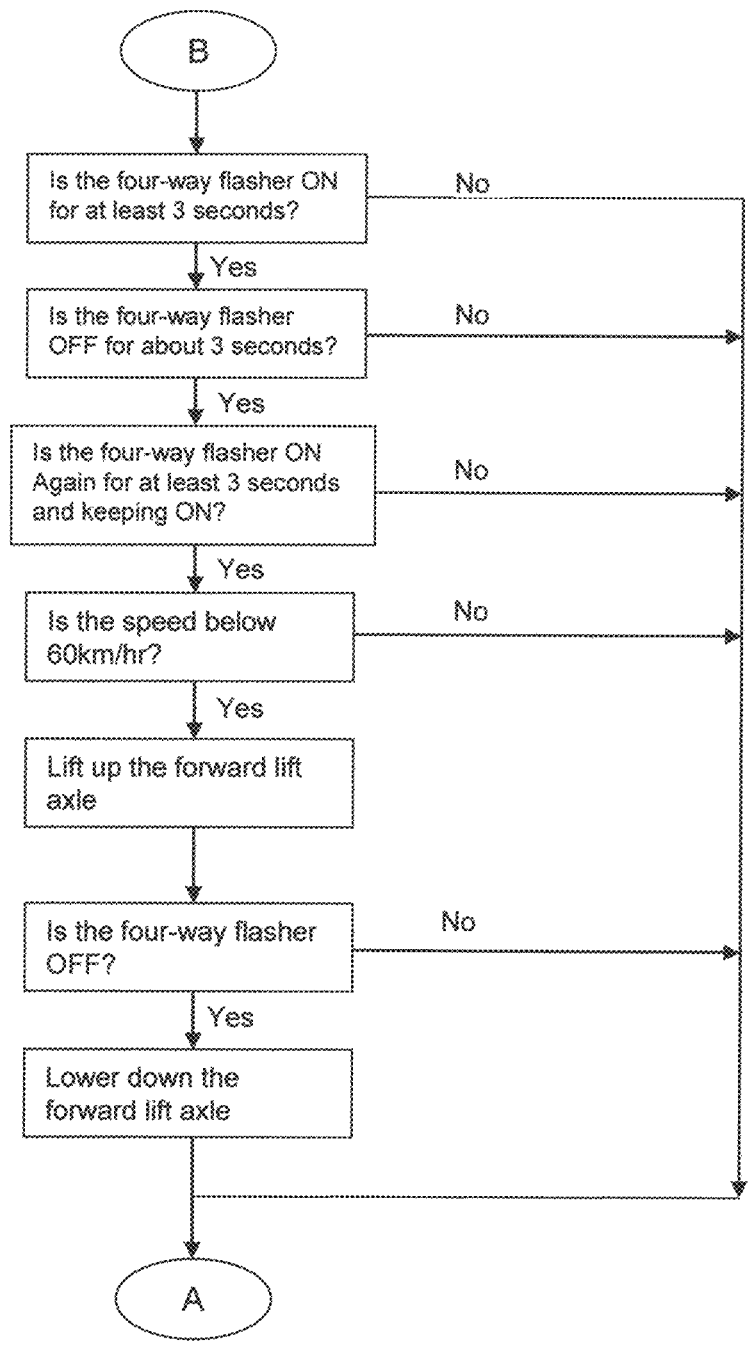

FIG. 12(B) shows further steps that may be implemented in the algorithm to respond to speed of the vehicle, and whether the four-way flashers are activated. When the vehicle is moving at a relatively slow speed (60 km/hr in this illustration), as indicated by a wheel speed monitor and activation of the four way flashers, the control module may cause or permit an axle to be lifted.

Figure 13:
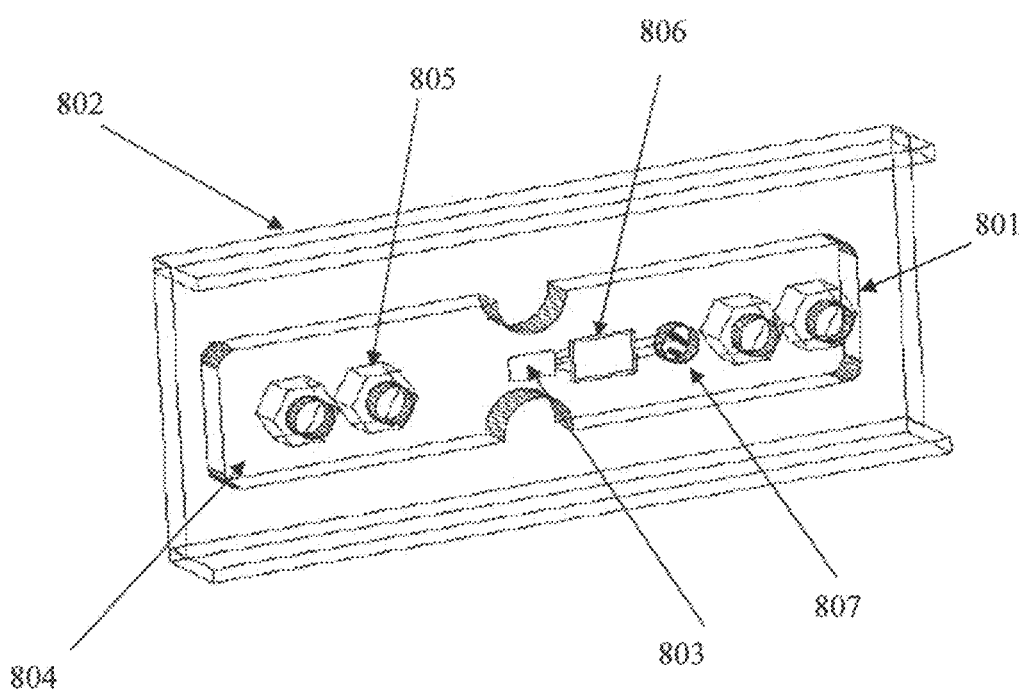
FIG. 13 shows how a load sensor according to one embodiment of the invention comprising a strain gauge may be installed on the frame of a vehicle without air suspension.
Figure 14:
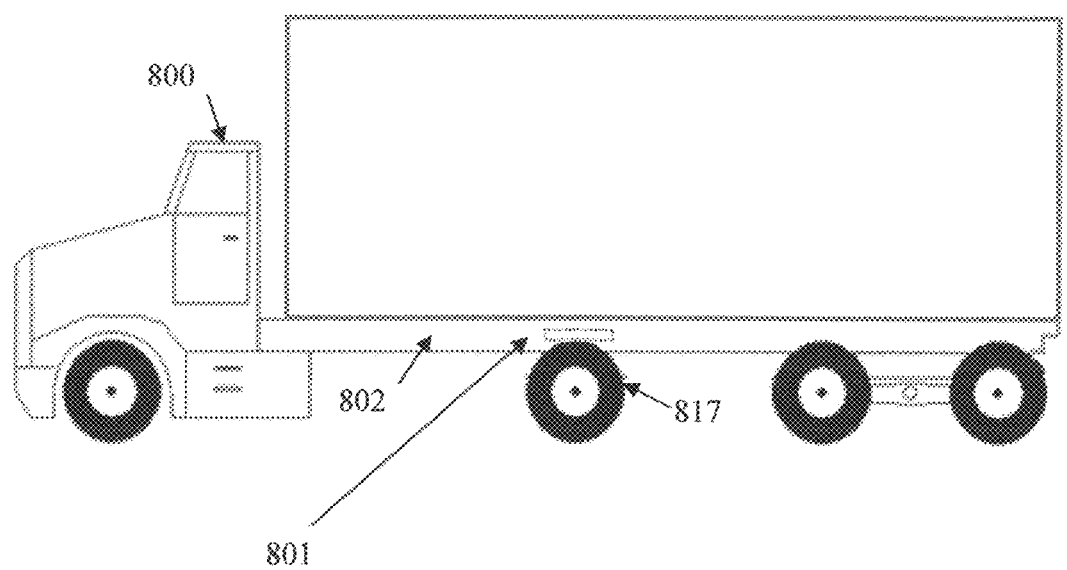
FIG. 14 shows a preferred location for mounting a strain gauge of FIG. 11.

FIGS. 13 and 14 show another embodiment of load sensor 801 installed on a non-air suspension truck or trailer 800 according to the present invention. The sensor 801 comprises a strain gauge 803 adapted for installation on the frame 802 of the vehicle adjacent the lift axle 817 so as to measure deflection on the frame 802 in proportion to how much weight the vehicle is carrying. A sensor plate 804 is mounted to the frame by any suitable connection method. In the embodiment illustrated four nuts and bolts 807 are utilized. With the vehicle loaded, the deflection of the frame 802 will transfer to the strain gauge 803 bonded on the sensor plate 804. A sensor cable (not shown) is attached at sensor connector 807 and, as in the embodiment shown in FIG. 7(B), will supply the excitation voltage needed for exciting the strain gauge 803 and transfer the load signal from the strain gauge to the control module. As with the embodiment in FIG. 7(B), an electronics circuit board 806, may be provided so that the signal from strain gauge 803 is amplified by and converted from analog to digital.

Other Sensors and Controls

Besides monitoring wheel speed and/or load weight, a system of this invention may gather other data useful for determining the operating status of a vehicle. Such data may assist the control module in optimizing configuration of the vehicle, or it may be gathered to provide warning systems for abnormal conditions that may require attention from the operator, maintenance personnel or owner. U.S. Pat. No. 5,959,365 describes early warning systems comprising sensors located on one or more vehicle axles adjacent to the wheels to detect changes in heat, noise, or vibration that may indicate potential problems in wheel hubs, bearings, brake pads or disks, and so on.

By way of illustration, the system may have one or more sensors to monitor wheel bearing temperatures. A temperature gauge may be positioned near the bearing housing, or made part of a speed sensor positioned at the end of a wheel axle. The system can thereby warn someone driving the vehicle of abnormal bearing temperature. The system may also have sensors to monitor tire pressure, by which it can warn the driver when tire pressure is below a predetermined threshold.

The module that controls the system may be further adapted or programmed to control, adjust, or optimize several aspects of vehicle configuration simultaneously. For example, when the vehicle is traveling in reverse, it can turn on trailer backup lights, activate a trailer backup alarm system, lift the trailer lift axle for ease of maneuvering, and lock or secure a steer axle. When travelling forward, it can automatically lower a lift axle after a set distance (for example, 100 feet), or upon reaching a set speed, pull out the trailer locking pin for free steering lock the steer axle when the vehicle reaches a predetermined speed (for example, 60 km/hr) for operation on the Highway. When below a predetermined speed, it may monitor four-way flashers, and lift an axle for emergency traction. The control module can also be made to activate dump shuts, gate valves, and undercarriage and cargo lights.

Supply and Installation

In principle, the wheel-end speed sensor may be mounted on any fixed axle of the vehicle, with the control module installed at a proximity that permits it to reliably receive information from the speed sensor and other input sources. For tractor-trailers, a practical arrangement is to install both the sensor and the control module onto the trailer. This way, the system can be calibrated to the trailer into which it is installed, and each trailer can come with its own system in place. The user may wish to standardize installation on multiple trailers in the fleet.

Reference to a monitoring or controlling assembly or system in this disclosure refers to a plurality of parts or components having the specified features and/or function. No particular form of assembly or interaction is required beyond what is specified or required.

Any of the systems or assemblies to this invention may be provided as separate component parts, or in kit form: for example, a wheel speed sensor and/or a load sensor and a control module. The kit may also contain one or more switches and actuators to lift or lower axles and/or lock steering mechanisms as appropriate, appropriate installing hardware, packaging, and instructions. Other sensors and components referred to in this disclosure (such as those that measure bearing temperature, or tire pressure) may also be included.

The various examples and illustrations referred to in this disclosure are provided for the benefit of the reader, and are not intended to limit the implementation or practice of the invention except where explicitly referred to or otherwise required in the claims that follow. The devices and methods of this invention can be effectively refined or modified by routine optimization without departing from the spirit of the invention embodied in the claims.

The invention claimed is:

1. A monitoring system to control lift axles on a vehicle comprising:
   a) a means for sensing vehicle speed and direction selected from the group consisting of a pair of Hall-Effect sensors, a wheel speed sensor adapted for installing on or about an axle end on the outside of a wheel, a bi-directional speed sensor installed in the rear differential, a bi-directional speed sensor installed in the transmission, a bi-directional speed sensor installed on the drive shaft or by having the control module adapted to intercept messages from other modules on a Controller Area Network (CAN) bus measuring speed and direction;

b) means for measuring the weight on the lift axles and fixed axles on the vehicle; and c) a control module for controlling one or more lift axles on the vehicle;

wherein the control module comprises a receiver for receiving transmitted information from the means for sensing vehicle speed and direction and the means for measuring the weight on the lift axles and fixed axles on the vehicle, a processor adapted to receive (i) information about vehicle speed and direction from the means for sensing vehicle speed and direction, and processes such information to determine when to cause said lift axles to be lifted or lowered and output means for causing said one or more lift axles to be lifted when the vehicle is moving in reverse, and which causes the lift axle to lower when the vehicle moves forward for a desired programmable distance and (ii) to receive information from means for measuring the weight on the lift axles and fixed axles on the vehicle about how much weight the vehicle is carrying, and causing the lift axles of the vehicle to assume or maintain a lifted position when the vehicle is empty or below a predetermined weight and causing the lift axles of the vehicle to assume or maintain a lowered position when the vehicle carries over a predetermined weight, and wherein the control module is programmed to cause a weight equalizing controller to equalize weight between the lift axles and the fixed axles by increasing or decreasing air pressure of lift axle load bags when lowered.

2. The monitoring system of claim 1, wherein the means for sensing vehicle speed and direction includes a microcontroller that only transmits information about wheel speed or direction selectively when there is change in wheel speed, wheel direction, and/or when wheel speed is below or above certain present values.

3. The monitoring system of claim 1, wherein the vehicle is a non-air suspension vehicle, and the load sensor is a strain gauge that measures deflection in a fixed axle or a frame rail on the vehicle or an angular sensor between a fixed axle of the vehicle and the vehicle's frame so as to measure the positioning of the axle relative to the frame.

4. The monitoring system of claim 1 further comprising one or more sensors to monitor wheel bearing temperatures, wherein the monitoring system warns someone driving the vehicle of abnormal bearing temperature.

5. The monitoring system of claim 1, further comprising one or more sensors to monitor tire pressure, wherein the monitoring system warns someone driving the vehicle of abnormal tire pressure.

6. A monitoring system according to claim 1, wherein on a vehicle with air suspension the control module is programmed to cause a weight equalizing controller to regulate air pressure for the auxiliary steer axle when a turn signal is activated above a programmed set speeds, the control module will not allow the system to decrease a previously programmed air pressure of the air suspension system associated with a liftable steer axle until the vehicle speed is below a programmed set speed at which time the control module causes the weight equalizing controller to decrease the air pressure of the lift axle suspension to assume an optimal proportion of vehicle weight, compared with the fixed axles during a turn and once the turn signal is switched off the air pressure of the lift axle suspension is increased back to the pre-turn value.

7. The monitoring system of claim 1, wherein the means for sensing vehicle speed and direction is a wheel speed sensor adapted for installing on or about an axle end on the outside of a wheel and comprising a two-axis accelerometer.

8. The monitoring system of claim 7, further comprising a mechanical generator or solar panel for recharging a battery that powers the sensor.

9. The monitoring system of claim 1 wherein the control module comprises a receiver which causes one or more of the functions selected from the group consisting of (a) a lift axle on the vehicle to lift when the vehicle is moving in reverse, and which causes the axle to lower when the vehicle moves forward for a desired programmable distance (b) a lift axle of the vehicle to lift when the vehicle is traveling below a predetermined speed and the vehicle's four-way flashers are activated (c) the vehicle's reverse warning signals and/or lights to be activated when the vehicle is traveling in reverse or (d) controls dump shuts, gate valves, undercarriage lights, or cargo lights.

10. The monitoring system of claim 9 wherein the receiver causes a lift axle of the vehicle to be lifted when the vehicle is traveling below a predetermined speed and the vehicle's four-way flashers are activated in a two-step process, turned on for first pre-determined time, then turned off for a second pre-determined time, then turned on again for at least a third pre-determined time.

11. The monitoring system of claim 1, wherein the vehicle is an air suspension vehicle, and the load sensor is a gauge that measures air pressure in the air suspension system.

12. A monitoring system according to claim 11 wherein on a vehicle with air suspension the control module is programmed to cause a weight equalizing controller to automatically allow the vehicle to equalize weight per axle through half load seasons.

13. The monitoring system of claim 1, wherein the means for sensing vehicle speed and direction is electronically configured to transmit a wireless signal verifying status of the means for sensing vehicle speed and direction on a periodic basis, but also configured to transmit wheel speed less often upon occurrence of one or more predetermined events, thereby reducing power drawn by the means for sensing vehicle speed and direction from its power supply.

14. The monitoring system of claim 13, whereby the event (s) are selected from change between forward motion, reverse motion, and/or stopped condition of the vehicle, and change of vehicle speed above and/or below certain predetermined levels.

15. The monitoring system of claim 13, which is powered by batteries and capable of monitoring and transmitting wheel speed for at least about 2 years under ordinary usage without requiring the batteries to be replaced.

* * * * *